United States Patent [19]

Garcia-Serra

[11] Patent Number: 4,833,720
[45] Date of Patent: May 23, 1989

[54] ENCODING SYSTEM CAPABLE OF USE WITH AN OPTICAL SCANNER AND SERVING AS A MAN-MACHINE INTERFACE LANGUAGE

[76] Inventor: Mario J. Garcia-Serra, 3399 Ponce De Leon Blvd., Coral Gables, Fla. 33134

[21] Appl. No.: 835,652

[22] Filed: Mar. 3, 1986

[51] Int. Cl.$^4$ .............................................. G06K 9/18
[52] U.S. Cl. ..................................................... 382/11
[58] Field of Search .................. 235/456, 462; 283/45, 283/57, 58, 17, 73; 358/263; 364/419, 518; 382/7, 11–13, 16, 21, 23, 24, 26, 36, 37, 56, 59; 434/159, 160, 162

[56] References Cited

U.S. PATENT DOCUMENTS

| | | | |
|---|---|---|---|
| 2,791,310 | 5/1957 | Jones | 382/11 |
| 3,142,039 | 7/1964 | Irland | 382/13 |
| 3,611,291 | 10/1971 | Frank | 382/11 |
| 3,938,186 | 2/1976 | Destame | 382/11 |
| 4,159,471 | 6/1979 | Whitaker | 382/24 |

OTHER PUBLICATIONS

Kala, Mohan S., "Man and Machine Compatible Alphanumeric and Metrological System", Research Disclosure, 8–1973.

Fougere, G. et al, "A Fast Numeral Reading Machine", Electronic Engineering, Sep. 1961, pp. 562–565.

Primary Examiner—Leo H. Boudreau
Assistant Examiner—Jose L. Couso

[57] ABSTRACT

A system of COMMUNICATION defined by an array of characters wherein each character following the first such character of the array is formed by a logical progression of construct placements added to a trunk or base common to each character wherein the constructs primarily include arrangement of a stem logically relative to the trunk or base wherein certain groupings of characters additionally include constructs including a dot, circle and a stem extension. The resulting array of characters provide a man-machine interfacing language which is virtually error-free when presented to an optical scanner system or other processing and communication apparatus in either typewritten (word processor) or hand-written or printed form.

28 Claims, 2 Drawing Sheets

FIG. 1

ENCODING SYSTEM CAPABLE OF USE WITH AN OPTICAL SCANNER AND SERVING AS A MAN-MACHINE INTERFACE LANGUAGE

BACKGROUND OF THE INVENTION

1. Field of the Invention

A system for presenting and defining an array of characters which effectively serves as a man-machine interfacing system and language capable of processing both alpha and numerical characters utilizing the subject coding system as a substitute for conventional language characters such as the English alphabet or Arabic numerals wherein each of the characters of the subject encoding system are defined as part of a logical progression of characters based on adding certain elements termed constructs to a base or trunk element which is common to each of the characters in the subject system.

2. Description of the Prior Art

The ability to obtain functionally perfect, complete, current or real time information about a variety of subjects or informational categories at an economically justifiable cost has yet to be realized. Because of the sheer size of the volume of transactions which would need to be personally classified, it is physically and economically impossible to manually construct a totally integrated profile of each category of one such area, such as the financial-services marketplace. In a commercial application each United States bank client, or each personal computer owner, etc. would be an example. Electronic systems presently available have as yet proven unable to perform the one function which would make possible the widespread composition of source generated individual personal-characteristic profiles at an economically justifiable cost. This one function is to read hand-written numerals or alphabetic characters with a degree of accuracy sufficient to allow for their use in business, educational, governmental, or like applications.

In prior art as well as commercially known systems, all efforts are presently directed to the design and manufacture of a cybernetic (computer based) system optically catalyzed to emulate human judgmental decisions in indentifying random pattern variations in humanly created written representations such as handwritten or hand-printed numerals or alphabetic characters. While such a goal may eventually be realized, all current indications, at least to the point of allowing for most commercial applications, indicate that the development of this type of "artificial intelligence" or so-called "fifth generation computers" is approximately 20 years away.

In the meantime, the relative importance of fulfilling day-to-day needs is increasing dramatically as the introduction of high technology to business techniques has drastically altered the competitive environment.

Further, it is now possible and in some areas even commonplace for a small firm, with a greater informational base and system to out-perform larger entities of the industry in the delivery of a better "package" of values at a reduced cost. The economics of scale are being overcome by the economics of information management and the centralization of information is now more essential to business success than the centralization of capital.

Accordingly, there is a need in all areas of modern society for a graphic system of representation for conventional phonetic values (sounds and phonemes), such as those which compose the English alphabet, into a character array which may be expressed in written or printed form by the human hand or conventionally by machines (word processors) wherein the subject system and the array of characters are representative of numerical and alphabetical values which are fully and directly usable and processable by both human beings and machines such as optical scanners. An important feature of such a system would be a logical derivation of the successive characters from a first or preceding character, based on the progressive placement of specific elements, herein termed constructs, from which each of the system characters are formed, relative to one another.

The logical and derivative defining of the successive characters of the subject encoding system would render the system easier to learn and much easier to utilize. This is even more apparent when considering the human language in its alphabetic form as well as the ten basic Arabic numerals. With the exception of the numeral 1, the appearance of none of the following numerals 2 through 0 provides any kind of indication as to their value or as to the nature of their relationship to one another. Similarly, the various letters of the English alphabet are, when considered relative to one another, a random display of linear and curvilinear lines and dots.

Preliminary limited experimentation has shown that a system comprising characters derived from a logical progression of inter-related constructs, instead of an absolute random display of characters, as in the case of both Arabic numerals and the modern English language, reduce the time and effort required to master the ability to use the alphanumeric representations of the subject system by as much as 50% to 70%.

In addition, an important feature of the subject encoding system which, in the scope of the present invention may be considered an optico-visual graphic system of alphanumeric and other representation, is the inherent, logical and progressive representation of the successive characters of the system being subject to 100% error-free interfacing with machine systems for purposes of conveyance of exact numerical, alphabetical and other meanings by people (human-systems) to such machine systems. The subject system not only has great adaptability and therefore potential economic value to the business world but also to educational programs in poverty stricken geographical areas.

Based on the above, it is readily apparent that the incorporation of the subject encoding system or graphic alphanumeric system into the various areas of modern-day society makes possible for the first time the error-proof recognition by machines (optical scanners) of handwritten and type-written alphanumeric and other values, and the instantaneous processing of the information thus conveyed. It also allows for the extremely economic generation of informational resources in a scope never before possible.

Attempts to accomplish the result obtained through the use of optico-visual graphic systems of alphanumeric representation of the type herein described are represented in the following U.S. Pats. Nos. to: Suzuki, 4,504,969; Bilzem, 4,461,029; Yasuda, 4,232,290; Hilley, 4,075,605; Schlang, 3,868,636; Spandersberg 3,858,180; Demonte, 3,860,909; Patterson, 3,766,520; Vanbilzem, 3,999,161; Morton 4,115,805; Buerger, 4,192,004; Nadler, 4,163,213; Frank, 4,189,711; Whittaker, 4,157,471; Morita, 4,193,056; Brayton, 4,177,448; Beall, 4,490,848; Schlang, 3,784,982; Schlang, 3,772,648; Rayfield, 3,731,276; Johnson et al, 3,631,394; Busby, 3,833,882; Destame, 3,938,186; Riley, 3,757,300; Postal, 3,786,237; Leighton, 3,699,518; Acker, 3,800,282; Greanias, 4,365,235; Casey, 4,499,596; Faby, 4,110,737; Clark, 3,938,088; Giuliano, 4,047,152; Rosedorff, 3,845,279; Sammon, 3,755,780; Dilingham, 3,903,503; Chou, 4,173,753; Grabowski, 4,468,809; and Funato, 4,505,537.

Based on the attempts in the prior art as evidenced at least in part by the above noted patents, there is still a need in the communication industry for a simple easy-to-handwrite alphanumerical text-representation system which is as easy to utilize by human beings as it is to process on an error-proof basis, by modern-day machine systems. A preferred system constitutes a man-machine interface "language" which provides a handwritten or machine printed array of characters to a processing machine system, such as an optical character scanner, for complete machine recognition and processing thereof.

SUMMARY OF THE INVENTION

The present invention is directed to an encoding system or an optico-visual graphic system of alphanumeric and other representation which incorporates a man-machine interface language. The subject system in essence is a communication base comprising a character array including a plurality of logically deduced characters which are processable by humans as well as by a machine systems. The term encoding system, as used herein, is not meant to define the subject system as an alphanumeric representation or character array which converts conventional languages, such as the modern English alphabet into code. In a description of the system of the subject invention as described herein, it is of course necessary that the set forth characters of the subject system derive their particular identity in value by reference to existing alphanumeric systems (modern English alphabet) and thus, it is inescapable that they serve to "represent" present day characters. However, in the strict sense, the subject system does not merely "convert into code" conventional language or alphanumeric characters. Rather, the subject system serves as a man-machine interface language as described in greater detail.

In its broad application, the subject system and the incorporated language being an integral part thereof, is designed to effectively replace the English alphabet and the Arabic numeral system, as well as other languages, by merging both these systems into a completely new set of man-machine recognizable characters. The subject system, in addition, is capable of providing the basis for the replacement of most other alphabetic or numerical systems in use throughout the world today.

As set forth above, the subject encoding system and the integrally contained man-machine interface character array or language is designed for full utilization by man and in addition, by machine systems such as electronic data processing computer systems incorporating optical scanners, etc. Utilizing the subject system in effect overcomes the more serious probems associated with man-machine compatible communication systems while at the same time being fully functional as a human only usage system.

In addition to the above, the subject encoding system and the attendant character array represent a modern symbolic representation system which eliminates the five-thousand year old differentiation of numerals from letters. To the contrary, the subject system establishes that letters are inherently like and directly derivative from numerals, utilizing the subject character array system, for purposes of visual representation.

Further, each character in the character array in derived in a logical order of progression of sequences wherein one or more constructs including a stem, dot, stem extension, and/or circle is positioned relative to a trunk or base of each character wherein the trunk is in fact common to each character. The placement of the various constructs relative to the trunk of each character follows the aforementioned logical order of progression and/or position and includes the general precepts of placement (a) from one end to the other on the trunk of each character and, then (b) from one side of the trunk to the other. The input of the various constructs also follows a predetermined order relative to placement in a preset position in connection with or adjacent the trunk base of each character and includes the stem first, then the dot, then the stem extension, then the circle, the latter circle placement dependent on the subject system character formed on a point matrix.

The invention accordingly comprises a combination of elements and arrangements of components in the aforementioned system which will be exemplified in the description hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a schematic representation in chart form of different embodiments of the subject character array defining the subject encoding system and comparison with Arabic numerals and English alphabetic letters.

Like reference numerals refer to like parts throughout the several views of the drawings.

DETAILED DESCRIPTION OF THE PREFERRED EMBODIMENT

Figures 2, 3, 4:
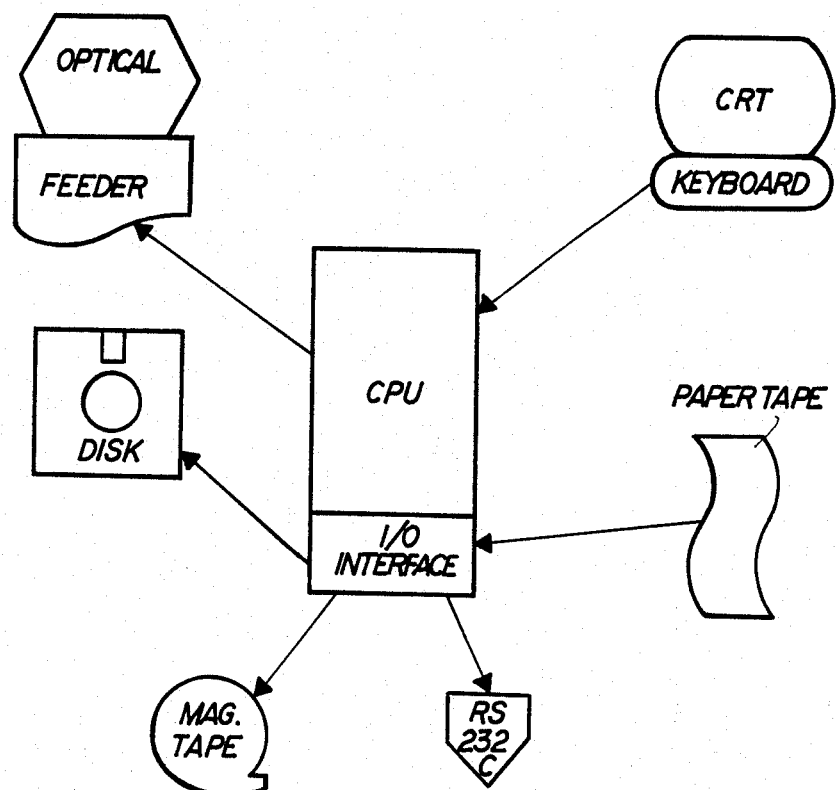
FIG. 2 is a predetermined character array using the characters of the subject encoding system defining single numerals among letters and a group of numerals among letters respectively.
FIG. 3 is a schematic representation of various hardware capable of interfacing the subject encoding system or optico-visual graphic system of alphanumeric and other representation.
FIG. 4 is a front plan view of a commercial check incorporating the subject system of the present invention.

The present invention relates to an encoding system which incorporates a character array or a logical progression of characters being representative of and equivalent to the alphabetical characters of a given language, such as English, and the conventional Arabic numerals, 1 through 0.

Figure 1:
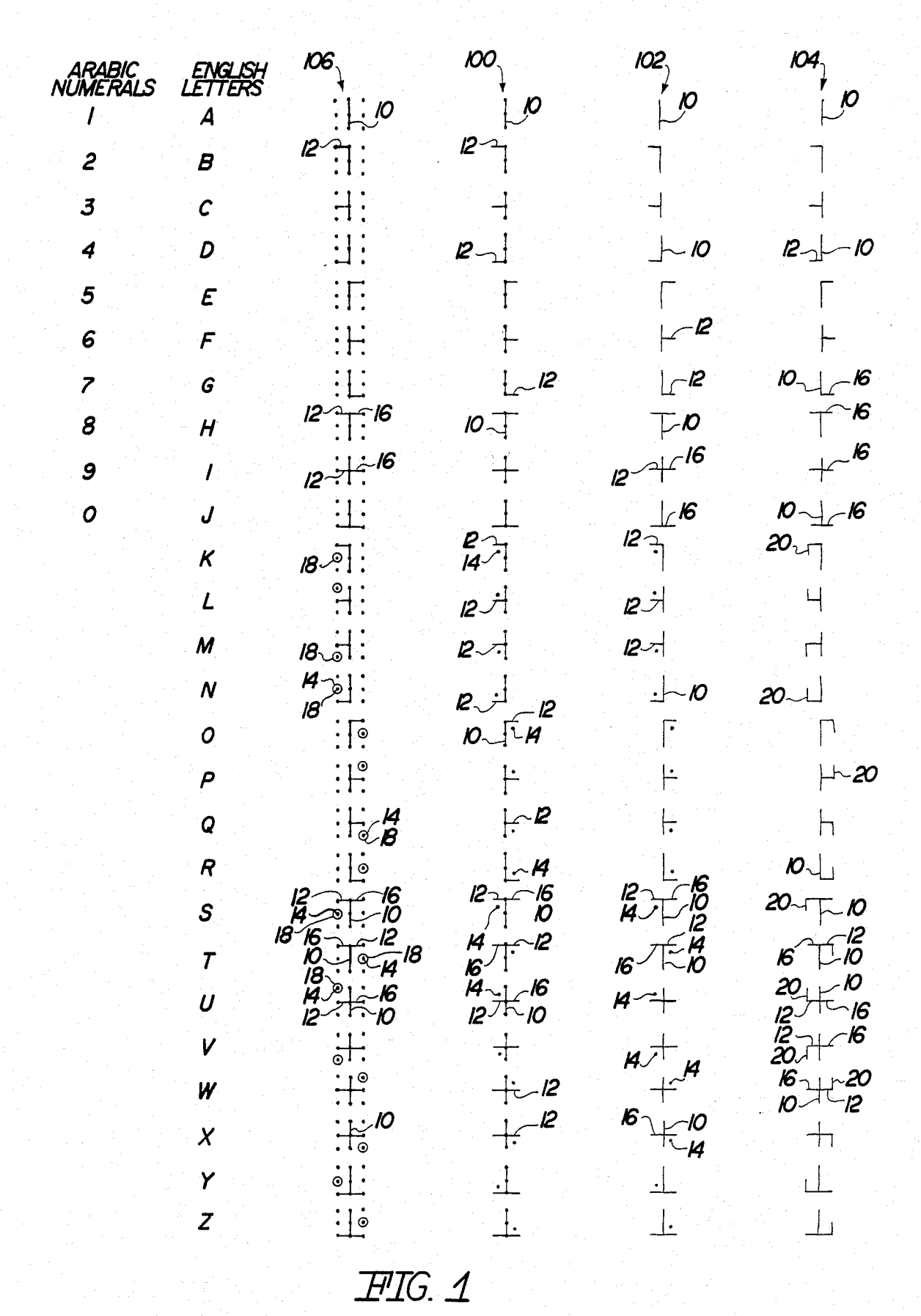

With reference to FIG. 1, columns 100, 102, 104, and 106 represent four different embodiments of the subject encoding system or more particularly, character array. For purposes of clarity, the Arabic numerals are listed in column form in registry with the English letters, and the various characters of the subject system are indicated and will be referred to successively by the corresponding English letter to which it is equivalent. More specifically, each of the system characters in columns 100, 102, 104 and 106 are representative of different embodiments. However, in each embodiment for example, the system characters as provided in column 100 are each representative of a specific letter, A through Z. In addition, the first ten system characters are additionally representative of Arabic numerals 1 through 0 in addition to letters A through J. Finally, the differences between the system characters in column 100, 102, 104 and 106 differs only in the manner of "printing" or placement of the individual system characters on the media, such as paper, cathode ray tube, etc. Again, more specifically, column 100 represents a handwritten representation of each of the system characters following a three point alignment of the trunk 10 passing through all three points. An important feature of the present invention is that the first system character is defined by a single trunk or base and that this trunk is common to all the system characters of the subject encoding system.

For purposes of clarity, each of the bases 10 as well as the plurality of individual constructs, to be described in greater detail hereinafter, will not be numbered, in terms of a reference numeral in each of the system characters. However, the trunk 10 will be indicated by the reference numeral 10 as the first system character equivalent both to the English alphabetic letter A and the Arabic numeral 1 and also, the trunk or base 10, common to each of the system characters, will have the same reference numerals.

A first grouping of the system characters further include and are defined by the placement of a first construct or stem 12 in one of six positions relative to the trunk 10. These six positions are defined by an outward extension of stem 12 from a first extremity, a mid portion and a second extremity and then successively extension of the stem 12 outwardly from the opposite side of the trunk from each of these first extremities and second extremities. The six stem placements are represented successively by the system characters successively equivalent with the English letters B through G. It should further be noted that the aforementioned first grouping of the system characters as represented in columns 100, 102, 104 and 106 each contain placement of a stem by itself in one of the six stem positions or in combination with a second construct defined by a dot or in combination with a stem extension, or in combination with both. Accordingly, all of the system characters in the first grouping each include a stem and include the equivalent of letters B through Z in the English alphabet.

A second construct or dot 14 is provided to define a second grouping of the plurality of system characters and, with reference to columns 100, 102, 104 and 106, such second grouping includes the placement of a dot 14 in one of six dot positions wherein the second construct or dot is used in combination with both a stem in system characters equivalent to letters K through R and in combination with a stem 12 and a stem extension 16 wherein such system characters include the equivalent of alphabetic characters S through Z.

The six dot positions of the dot 14 are defined by a positioning of the dot generally between the stem 12 and the base 10 which meet at a substantially perpendicular angle to one another. Accordingly, with specific reference in each of the aforementioned columns of system characters, the dot position is always placed between a stem 12 and a base 10 and accordingly, the stem extension 16, which is always colinear to an associated stem 12 and extending outwardly from an opposite side of the base 10 is always spaced from the dot placement. Specific reference is directed to the system characters equivalent to alphabetic letters S through U wherein dot 14 is between stem 12 and base 10 and stem extension 16 extends outwardly from base 10 and colinear to stem 12. Differences between the system characters representative and equivalent to alphabetic letters S and T are noteable.

Based on the addition of the stem extension 16 with each of the first two constructs, it is clear that a third grouping of the plurality of system characters are representative of those system characters including the stem extension 16.

Further with regard to FIG. 1, it is important to note that the subject encoding system and man-machine interface language of the present invention can be machine recognizable when done in printed form (column 100), free hand (column 102), or pre-printed in part by machine (either column 100 or 106) and completed by a human writer. In the embodiment of the system characters in column 106, a nine point matrix is utilized to properly place the trunk 10 and various constructs including stem 12 and dot 14. This format is perhaps best used in practical application when pre-printed on commercial paper or a conventional bank check (see FIG. 4) wherein it would be a relatively simple matter, once the machine language is put into practice, to add the other constructs including stem 12, stem extension 16, dot 14, and a third construct including circle 18 by the human writer. The circle is provided for use in indicating a dot in one of the six dot locations when the nine point matrix is utilized. Accordingly, circle 18 surrounds the dot for dot designation and is precisely the same as the second grouping of letters, as mentioned above, and equivalent to letters K through Z, and the equivalent of the printed and free-hand system characters of columns 100 and 102.

Again with reference to FIG. 4, since the base or trunk 10 is common to each of the system characters, it can be pre-printed onto the check format or form and the mere addition, by free-hand, of the various constructs including stem 12, stem extension 16, and circle 18 may be added. Accordingly, in first application and again with reference to the commercial paper or check generally indicated as 30, the user thereof would have the option of writing in conventional script form or by printed letters, the content of the check including data, payee, dollar amount, etc. However, in order to process the check almost exclusively by machine and at the same time allow the encoding system applied to the check by the user to be easily readable by both man and machine, the subject encoding system could be placed on the nine point matrix with the trunk pre-printed thereon. At a point of reference, the alphabet in English, A through Z could be pre-printed and represented on the top of the check; similarly, numbers 1 through 0 could be preprinted as indicated respectively as 32 and 34.

With reference to FIG. 3, it is therefore clear that any type of conventionally known and currently available processing machine including optical feeders, cathode ray tube with keyboard activation, paper tape, mag tape, or magnetic disc storage could all be utilized in the processing of the encoding system of the present invention wherein the system characters, in their various form, could be substituted for the English alphabet thereby allowing and providing a total man-machine interface language.

With reference to the embodiment in FIG. 1 represented by the system characters in column 104, it should be emphasized that an important feature of the present invention is the formation of the character array of all the system characters in a logical progression wherein one system character, for example representative of the English letter D, is in fact a logical progression of the system character representative of the English letter C, which in turn is a logical progression of the system character representative of the English letter B. As set forth above, the letters B, C, D, E, F, G, etc. are all defined by a "logical progression" of the placement of the stem 12 in each of the six stem positions. In addition, the letters H through J are defined by respective placement of the stem 12 successively in the first three stem positions and the addition of a stem extension 16; the letters K through R are defined by a logical progression and placement of the stem 12 relative to the trunk 10 and the addition of a second construct in the form of a dot 14 relative to the placement of the stem 12 wherein the dot is placed in each of the six dot positions and further, wherein the letters S through Z are defined by logical progression of the stem 12, the dot 14, and the stem extension 16 all in combination with one another, but, in a logical progression of placement relative to the trunk 10. Again, for purposes of clarity, it is emphasized that the embodiment of the system characters as indicated in column 106 differs from the system characters in columns 100 and 102 only by the addition of a third construct in the form of a circle being representative of the six dot locations by surrounding one of the outside points of the nine point matrix being represented as a dot 14.

Finally, with regard to the system characters in the column 104, the second construct in the form of a dot is eliminated and supplemented by placement of a stem supplement 20 in letters K through Z. This embodiment is therefore provided to emphasize the fact that the important feature of the present invention is a logical progression and relative derivation of one system character on the preceding system characters so as to make the subject encoding system, defined by the array of characters, both much easier to learn and more accurate to implement.

It should further be emphasized that while each of the system characters defining the character array of the subject encoding system are shown in an "upright" position wherein the trunk of each system character has s substantially vertical orientation relative to the paper or media on which it is formed, each of the character systems could be equally effective if the orientation of the trunk was other than in a totally upright position such as in a horizontal or angular orientation. The important feature is that the individual constructs including the stem, dot, circle, stem extension, stem supplement, etc. are all applied to the trunk from one end to the other, including passing through a mid point or substantially intermediate portion thereof and extending outwardly from one side or the other in the manner indicated in greater detail herein throughout.

It is important in the present invention to emphasize that certain components of characters have been described and represented with somewhat exact relative positioning or intersecting with one another. However, it is recognized that optical scanner equipment is programmed to recognize characters on the basis of "sectors of intersection" rather than "points of intersection" and thus, a character represented at less than an ideal appearance or including less than exact positioning of the components of the character, will nonetheless be correctly identified by the machine-system. Accordingly, specific reference to intersecting components of a character is meant to include a certain amount of acceptable variation especially when the characters are handwritten.

With regard to FIG. 2, as pointed out above, the first ten system characters are concurrently representative of both the first ten letters of the English alphabet, letters A through J, as well as being representative of the progressive Arabic numerals 1 through 0. In order to eliminate any confusion when either man or machine "reads" a single numeral or a group of numerals inserted among system characters, as shown in FIG. 2, a hidot 25 and two spaced apart hidots 25' are utilized. As shown in FIG. 2, single numerals among letters is represented by a hidot 25 (fourth system character from the end) which in fact is the equivalent of English letter H and Arabic numeral 8. In order to distinguish, to the reader, what designation is intended, the hidot 25 is provided. Similarly, spaced apart hidots 25' are positioned to offset numerals 3 and 8 (combined Arabic numeral 38). Of course, absent of the spaced apart hidots 25' these system characters would indicate to the reader that the letters C and H were represented there which would have no meaning in the English language. Charactercodes intended to represent a decimal system numeral will always be represented as hi-dotted in an individual or group mode, as shown in FIG. 2, unless the specific situs of entry has been programmed so as to recognize all characters therein as having a numeric value only, regardless of the presence or absence of any hi-dotts or "numeric identifiers", in which case no hi-dotts wil be required.

In reference to the first character of the subject system, it is important to note that whenever this character is pre-printed on a form so as to facilitate the rapid entry of characters, the pre-printed character itself must be composed of two very proximate parallel lines instead of just one vertical line. This is motivated by the need to provide even a minimal area which must be "blackened in" by a writer who intends to indicate the presence of either an "A" or a "1". If such "white" area did not exist, there would be the chance, however remote, that the writer would make his mark totally within the borders of the printed vertical dash, and thus fail to trigger the light-reflectance recognition process. This condition does not apply to handwritten or original entry machine printing, such as typing or computer printing.

It is therefore to be understood that the following claims are intended to cover all of the generic and specific features of the subject invention herein described, and all statements of the scope of the invention which as a matter of language, might be said to fall therebetween.

Now that the invention has been described.

What is claimed is:

1. A system for encoding conventional alpha-numeric characters into a man-machine interfacing language optically recognizable by both man and machine, said system comprising:
   (a) a plurality of system characters sufficient in number to at least equal the number of alphabetic characters in a given language being encoded,
   (b) each system character comprising a commonly oriented trunk having an elongated, linear configuration and a substantially common dimension, (c) a first grouping of said characters comprising all of said system characters except a first character thereof, including a first construct defined by a stem having an elongated, linear configuration and extending outwardly from one of six successively disposed stem positions and in substantially perpendicular relation to said trunk, (d) said six stem positions respectively defined by said stem connected to and extending outwardly from a first extremity, a mid portion, and a second extremity on a first side of said trunk and said first extremity, said mid portion and said second extremity on a second side of said trunk, (e) each of said system characters at least partially defined by and distinguished from one another by the location of said stem at one of said six stem positions, (f) a second grouping of said plurality of system characters further comprising a second construct defined by a dot positioned in each of said system characters between one side of said stem and a correspondingly positioned side of said trunk and in one of six dot positions relative to said trunk, (g) placement of said dot in any one of said six dot positions being dependent on the disposition of said stem in one of said six stem positions, (h) said second grouping of system characters comprising all but a first ten of said system characters and including said dot placed in combination with said stem, said dot varying in location and disposed in each of said six dot positions dependent on the location of said stem, (i) a third grouping of said plurality of system characters comprising a number of system characters absent any dot designation and an additional number of system characters including said dot designation, said third grouping further comprising a stem extension having a linear, elongated configuration and secured to said trunk in perpendicular relation thereto and in colinear relation to an associated stem, (j) said plurality of system characters successively defined by progressive placement of said stem through each of said six stem positions, subsequent placement of said stem extension relative to an associated stem through the first three stem positions and placement of said dot both independently of and in combination with placement of said stem and stem extension relative to said six stem positions, and (k) each of said system characters being formed on a point matrix defined by nine points collectively arranged in a 3×3 array, said trunk extending through a centered three points of said matrix, said six stem positions defined by said stem extending in perpendicular relation to and outwardly from said trunk successively into contact with each one of an outer three points of each side of said trunk.

2. A system as in claim 1 wherein said plurality of system characters are equal in number to the number of alphabetic characters in the English language, said successive ones of said system characters, beginning with a first one thereof, being an equivalent to the successive characters of the English alphabet beginning with the character A.

3. A system as in claim 2 wherein the first ten of said plurality of system characters are structurally formed to be the equivalent of the successive numbers 1 through 0.

4. A system as in claim 2 wherein said first system character is equivalent to the character A in the English language and is defined by said trunk absent said first construct and said second construct used in combination therewith.

5. A system as in claim 4 wherein the next six system characters following said first system characters of respectively the equivalent of characters B through G in the English language and are respectively defined by the successive placement of said stem in each of said fixed stem positions.

6. A system as in claim 5 wherein said next three system characters following said first seven system characters are respectively the equivalent of characters H through J of the English language and are respectively defined by said stem extension and associated stem connected to said trunk successively at said first extremity, said mid portion and said second extremity.

7. A system as in claim 6 wherein said first ten system characters are successively equivalent to respective numerical characters 1 through 0 and also equivalent to successive characters A through J of the English language.

8. A system as in claim 7 wherein numerical and letter designations are distinguishable by placement of a hidot immediately above any such system character being the equivalent of a numerical character when standing alone and bracketed by two spaced apart hidots, immediately above and before a linear grouping of said system characters representing numerical characters.

9. A system as in claim 6 wherein the next eight system characters followng said first ten system characters are respectively the equivalent of characters K through R of the English language and are respectively defined by a first four system characters of said next eight system characters comprising said stem in one of said first three stem positions and said dot in one of said first three dot positions; a second four of said next eight system characters comprising said stems in one of said second three stem positions and said dots in one of said second three dot positions.

10. A system as in claim 9 wherein said next eight system characters following said first eighteen system characters are respectively the equivalent of characters S through Z of the English language and are respectively defined by said stem extension and associated stem positioned respectively at said first extremity of said trunk, said mid portion thereof and said second extremity of said trunk and said dot positioned in each of said six dot positions dependent on the position of said stem extension and said associated stem.

11. A system as in claim 1 wherein said first character of said plurality of system characters comprises said trunk absent any connection with said first construct, said second construct and said stem extension.

12. A system as in claim 1 wherein said second grouping further comprises said dot placed in combination with said stem extension absent any stem standing alone, said dot varying in location and disposed in each of said six dot positions dependent on the location of said stem extension.

13. A system as in claim 12 wherein said second grouping includes system characters of said third grouping and said first grouping includes all system characters of both said second grouping and said third grouping.

14. A system as in claim 1, wherein said first three system characters of said third grouping are successively defined by said stem extension and associated stem positioned along the length of said trunk outwardly from said first extremity, through said mid portion and to said second extremity.

15. A system as in claim 1 further comprising a third construct being defined by a circle disposed in surrounding relation to one point of said outer three points and placed in combination with and relative to said stem to define at least some of said system characters of said second grouping; said point being surrounded by said circle defining said dot of said second construct.

16. A system as in claim 15 wherein said circle surrounding one of said points of said outer three points is used in combination with said stem extension and associated stem and absent any other stem defining at least one of said system characters of said third grouping.

17. A system as in claim 15 wherein said trunk is oriented in an upright position and extends through each of said centered three points disposed in a substantially vertical orientation.

18. A system as in claim 17 wherein said outer three points to the left and right of said vertical centered three points comprise a first outer three points and a second outer three points respectively.

19. A system as in claim 18 wherein said stem placement successively between each point of said first outer three points and said trunk defines a first three of said six stem positions and placement successively between each point of said second outer three points and said trunk defines a second three of said six stem positions.

20. A system as in claim 19 wherein said six dot positions are successively defined by placement of said circle in surrounding relation to said successive points of said first outer three points and said second outer three points respectively.

21. A system as in claim 1 wherein said first system character is equivalent to the character A in the English language and is defined by said trunk being oriented in an upright, substantially vertical position relative to a display carrier on which it is placed and being absent said first construct and said second construct in combination therewith.

22. A system as in claim 21 wherein the next six system characters are respectively the equivalent of characters B through G in the English language and are respectively defined by the successive placement of said stem in each of a first three stem positions on the left side of said trunk and at a second three stem positions on a right side of said trunk.

23. A system as in claim 22 wherein said next three system characters following said first system characters are respectively the equivalent of characters H through J of the English language and are respectively defined by said stem extension and associated stem connected to said trunk successively at said first extremity, said mid portion and said second extremity.

24. A system as in claim 23 wherein said first ten system characters are successively the equivalent to respective Ababic numerals 1 through 0 and also successively equivalent to the respective charaters A through J of the English language.

25. A system as in claim 24 wherein numerical and letter designations are distinguishable by placement of a hidot immediately above any such system character being the equivalent of a numeral character when standing alone and bracketed by two spaced apart hidots, immediately above and before and after a linear grouping of said system characters representing numerical characters.

26. A system as in claim 25 wherein the next eight system characters following said first ten system characters are respectively the equivalent of characters K through R of the English language and are respectively defined by a first four system characters of said next eight system characters comprising said stem in one of said next eight system characters comprising said stem in one of said first through three stem positions and said dot in one of said first three dot positions; a next four system characters of said next eight system characters comprising said stems in one of said second three stem positions and said dot in one of said second three dot positions.

27. A system as in claim 26 wherein said next eight system characters following said first eighteen system characters are respectively the equivalent of characters S through Z of the English language and are respectively defined by said stem extension and associated stem positioned respectively at said first extremity of said trunk, said mid portion thereof and said second extremity of said trunk and said dot positioned in each of said six dot positions dependent upon the position of said stem extension and said associated stem.

28. A system as in claim 1 wherein said second grouping of said plurality of system characters are defined by substitution of a stem supplement for said dot, said stem supplement extending from an outer extremity of a stem in substantially parallel relation to said trunk and directed towards an original dot position normally occupied by said dot.

* * * * *